NESTED PLASTIC BAG PRODUCTION PROCESS AND APPARATUS

Filed Oct. 9, 1967                                                                         6 Sheets-Sheet 1

INVENTOR.
RICHARD F. NESTLER
BY   MARCUS W. DODD
DONALD B. MAY

May 26, 1970     R. F. NESTLER ET AL     3,513,755
NESTED PLASTIC BAG PRODUCTION PROCESS AND APPARATUS
Filed Oct. 9, 1967                                             6 Sheets-Sheet 4

INVENTOR.
RICHARD F. NESTLER
BY    MARCUS W. DODD
DONALD B. MAY

United States Patent Office 3,513,755
Patented May 26, 1970

3,513,755
NESTED PLASTIC BAG PRODUCTION PROCESS
AND APPARATUS
Richard F. Nestler, Marcus W. Dodd, and Donald B.
May, Pittsburgh, Pa., assignors, by direct and mesne
assignments, of fifty percent to said May, forty-three
percent to said Nestler and seven percent to Mercey
Firestone
Filed Oct. 9, 1967, Ser. No. 673,889
Int. Cl. B31b 23/74, 49/04; B65h 67/06
U.S. Cl. 93—12                                          8 Claims

ABSTRACT OF THE DISCLOSURE

This invention is apparatus and process for producing nested plastic bags, wherein bags not having round bottoms but instead having a line seal bottom are nested together in groups of roughly twenty-five. In accordance with one specific embodiment, apparatus is provided for producing plastic bags by taking a strip of flat plastic film and automatically converting the flat film into plastic bags and then nesting the plastic bags one inside another in groups of roughly twenty-five to fifty bags. This is accomplished by folding the flat plastic film longitudinally and inserting a mandrel between the folds of the plastic film before the film is made into bags, so that at the time the plastic film is made into a bag the mandrel for nesting the bag is already inside of the bag. A plurality of mandrels are employed which are effectively mounted to move about a common axis and which successively enter portions of the folded plastic film which is to be made into bags. With this motion, substantially all of the reciprocating motion is eliminated from the nesting of plastic bags and high velocities and high rates of production are attainable.

In accordance with another specific embodiment we provide an apparatus for producing nested plastic bags employing a floating mandrel which is located inside a sleeve of plastic film and is positioned by external force such as gravity or magnets and a receiving mandrel of hollow configuration which is shaped to fit partially inside of the floating mandrel so that the receiving mandrel moves partially inside the floating mandrel. Mechanical gripping means are connected to the receiving mandrel for grasping the sleeve of plastic and moving it onto the receiving mandrel as the receiving mandrel moves away from the floating mandrel. When the two mandrels are separated, cutting and sealing means move in between the mandrels cutting and sealing the film to form a plastic bag.

In accordance with another specific embodiment we provide apparatus for taking flat bags as from a flat bag production machine and nesting those bags one inside of the other to form a nest of bags. This is accomplished by taking the bags as they come off of the primary machine, opening their mouth and moving them onto a primary collapsed mandrel, which upon receiving the bag moves to another position, expands to substantially the full size of the bag and deposits the bag in a secondary or receiving mandrel, which has a plurality of bags therein already, so as to deposit the bags in a nested and cuffed configuration.

BACKGROUND OF INVENTION

Field of invention

In the use of plastic bags it has been found desirable to have plastic bags provided in a nested configuration in a generally open manner with the open ends turned back to form a cuff. This invention involves a machine for producing plastic bags in such a nested configuration.

Description of prior art

In accordance with the prior art of which we are aware, up until the invention described in patent application No. 523,239 filed Dec. 10, 1965, no use had been made of nested plastic bags and no machinery had been built for producing nested plastic bags. In that application, there is described the need for nested plastic bags and a machine which might construct round bottom plastic bags by a process which is referred to as involution, wherein successive bags are constructed successively on a mandrel, by sealing a strip of film around a mandrel and attaching thereto a round bottom piece over the end of the mandrel.

SUMMARY OF THE INVENTION

This a a machine for taking a strip of flat plastic film and automaticaly converting the flat film into plastic bags and then nesting the plastic bags one inside another in groups of roughly twenty-five to fifty bags. This is accomplished by folding the plastic film strip lengthwise and inserting a rotating mandrel between the folds of the plastic film before the plastic film is made into bags, so that at the time the plastic film is made into a bag, the mandrel for nesting is already inside of the bag. A plurality of mandrels are employed which are effectively mounted to rotate about a common axis and which successively enter portions of the plastic film which are to be made into bags. Thus, with this motion, substantially all of the reciprocating motion is eliminated and a high speed machine for nesting plastic bags is obtained.

In accordance with one embodiment of this invention, we provide a machine for the production of nested plastic bags, employing a long sleeve of plastic material, preferably polyethylene, in a rolled configuration which is on a rotatable mount. This apparatus for producing nested plastic bags employs a floating mandrel of hollow configuration which is located inside a sleeve of plastic film and is positioned by external force such as magnets or gravity, and a receiving mandrel of hollow configuration which is shaped to fit partially inside of the floating mandrel. Mechanical gripping means are connected to the receiving mandrel grasping the sleeve of plastic and moving it onto the receiving mandrel as the receiving mandrel moves away from the floating mandrel. When the two mandrels are separated, cutting and sealing means move in between the mandrels cutting and sealing the film to form plastic bags.

This is an apparatus which takes plastic bags either from a bag-making machine or from a stack of flat plastic bags, opens the bags and moves them onto a primary collapsed mandrel. This is an apparatus for taking flat bags as from a flat bag production machine and nesting those bags one inside of the other. As the bag comes off of the primary machine, the mouth is opened and it is moved onto a primary collapsed mandrel which upon receiving the bag moves to another position, expands to substantially the full size of the bag and deposits the bag in a secondary or receiving mandrel, which has a plurality of bags therein already, so as to deposit the bags in a nested and cuffed configuration.

DESCRIPTION OF THE DRAWINGS

FIGS. 6, A, B, C, and D are cross-sectional showings of successive relative positions of the primary and secondary mandrels as a bag is being transferred from the primary to the secondary mandrel.

FIG. 7 is a schematic cross-sectional showing of a secondary mandrel having a plurality of bags nested and cuffed thereon.

DESCRIPTION OF PREFERRED EMBODIMENTS

Figure 1:
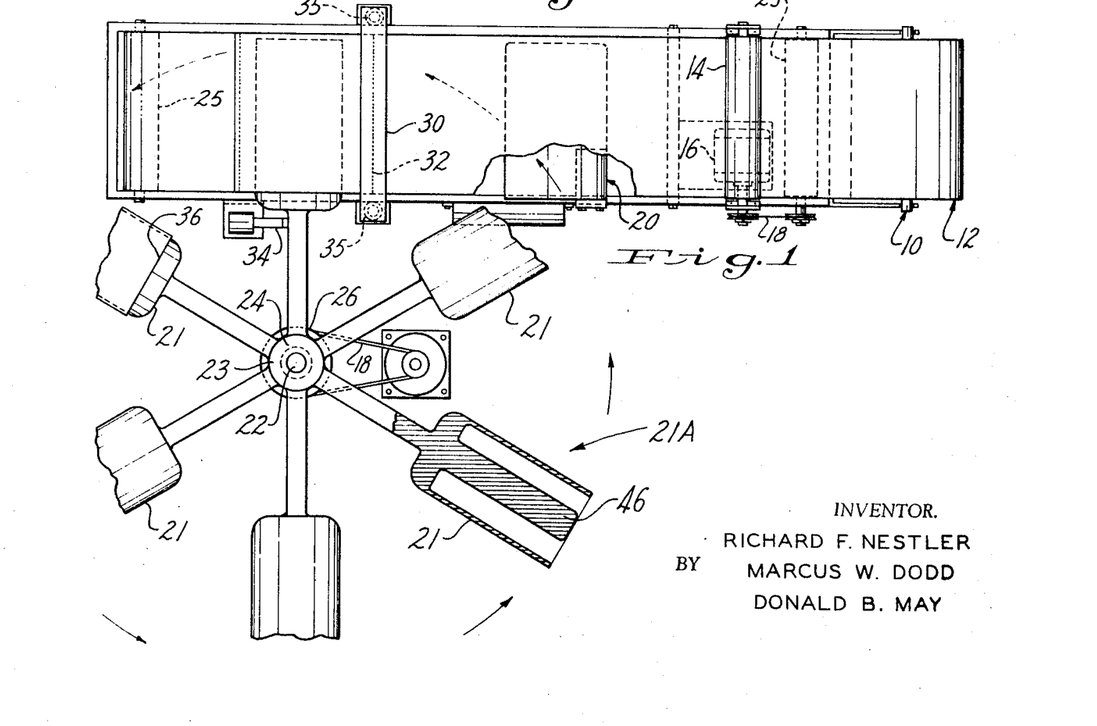
FIG. 1 is a plan view, partially cut away, showing apparatus in accordance with our invention.
Figures 2, 3, 4:
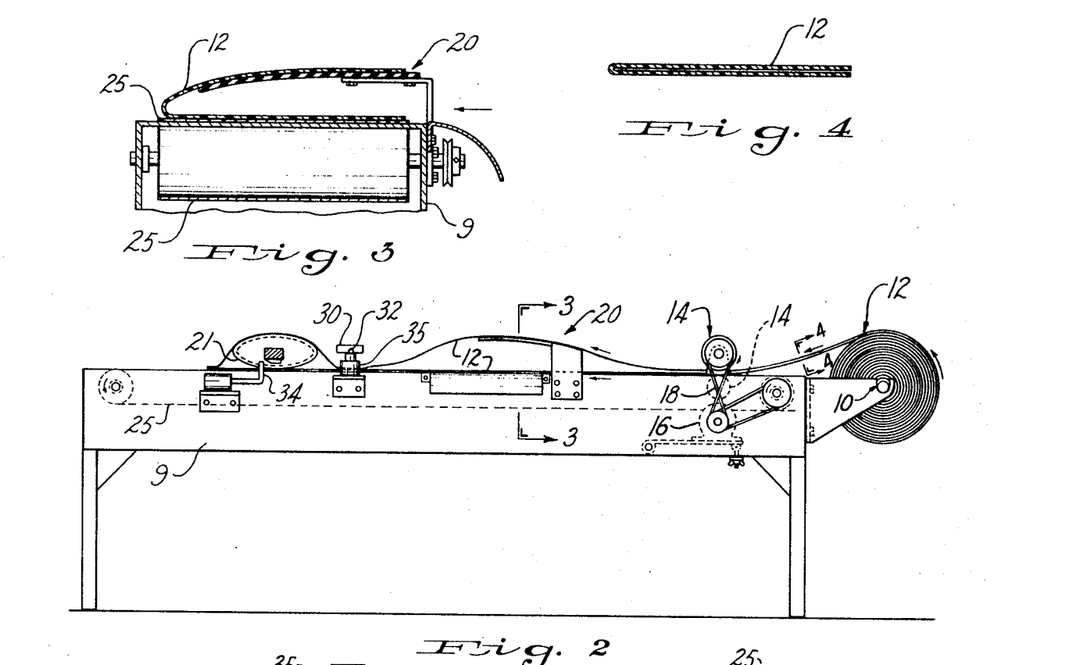
FIG. 2 is an elevational showing of the apparatus shown in FIG. 1.
FIG. 3 is a partial cross-section taken along the line 3—3 of FIG. 2.
FIG. 4 is a showing in cross-section of the plastic film strip separating means, taken along the line 4—4 of FIG. 2.

In accordance with our invention, we provide an axle 10 holding a roll of flat plastic film 12 with its axis parallel to the horizontal. We provide a pair of cooperating feed rollers 14 which are powered by an electric motor 16 though a belt 18 for feeding the plastic film 12 from the roll. The two cooperating feed rollers 14 press the plastic film 12 flat and pull the film off the supply roll. In addition, the pulling rollers 14 tend to cause the plastic film strip 12 leaving the pulling rollers to move along toward the end of the line. Underneath of the plastic film strip 12 on either side of the rollers 14, we provide a smooth, generally frictionless surface to allow free movement of the plastic film strip. If the plastic film 12 is not already folded, guide bars (not shown) are provided for gradually folding the strip of plastic film continuously along its longitudinal axis. This folding is accomplished by any of several devices for continuously folding materials well known in the art, primarily by having the end of the plastic film folded and inserted into the pair of cooperating vise rollers 14 that pull the strip of plastic film 12 from the roll. Since one end of the plastic film 12 is flat and the other end is folded, the folding can be accomplished so as to maintain it under control, by having an edge control device positioned against the edge of the lower half of the plastic film and by having a guide bar extending into the folded plastic film to the center line of the plastic film strip, to produce the interior line of fold and by having a guide bar on the outside folding the plastic film.

Adjacent and beyond the feed rollers 14 along the line of movement of the plastic film strip 12, we provide an opening guide bar 20 situated to separate the two layers of film 12 so as to provide convenient entrance of a horizontally extending construction mandrel 21 mounted on a wheel 21A, rotating about a vertical axis 22 into the already folded film without contact with the edges of the film.

The construction mandrels 21 are mounted on a vertical axis 22 located a substantial distance from the line of movement of the plastic film strip 12 and just beyond the opening guide bar 20. The construction mandrels 21 are located off center with respect to the plastic film strip 12 so that as they rotate about a vertical axis 22 they will move into the plastic film strip 12 to a point where the end of the construction mandrel 21 is near the bottom or fold line of the plastic film strip 12. These construction mandrels 21 are preferably located so that they rotate under the guide bar 20 successively into the interior of the folded plastic film strip 12.

The construction mandrels 21 are mounted on a vertical axle 22 which supports the mandrels and holds them so that they will rotate in a horizontal plane. The construction mandrels 21 are preferably attached to a hub 23 which fits over the vertical mandrel supporting axle 22 in a loose or unfastened manner. Thus the construction mandrels 21 are free to rotate independently of the axle 22 except for the frictional connection between the hub 23 supporting the mandrels and the sleeve 24 of the axle produced by the gravitational forces on the mandrel, causing the mandrel hub 23 to press against the sleeve 24 on the axle 22. Thus a natural type automatic clutch mechanism is provided whereby the construction mandrels 21 will not tear the sealed end of the plastic film 12 but will automatically be slowed down or held back by the sealed end of the plastic film strip and adjust so as to coordinate exactly with the speed of flow of the plastic film from the rollers 14.

Since the end of the folded plastic film strip 12 has, been advanced beyond the separating or opening guide bar 20 at the time that it is cut and sealed, therefore it is usually in a position sufficiently advanced so that the next construction mandrel 21 can enter the folded plastic film strip 12 and by its movement help advance the end of the plastic film strip. Further, in a preferred embodiment of our invention, we provide a moving conveyor belt 25 located immediately under the path of movement of the plastic film 12 which supports and encourages movement of the plastic film strip.

The construction mandrel support axle 22 and the rollers 14 are powered so as to rotate at a velocity that causes the ends or noses of the construction mandrels 21 to move at the same rate of speed, or slightly slower than the rate of flow of the plastic film 12 from the rollers 14. The construction mandrels 21 should not move at a velocity slower than the rate of plastic film 12 from the rollers 14. Preferably this is accomplished by having both the construction mandrel axle 22 and the rollers 14 powdered by two independent motors 16 moving at the same rate of speed and by having a belt 18 from the mandrel axle motor 16 leading to a large sheave 26, which, in turn, is connected through a universal joint (not shown) comprising a differential joint (not shown) which comprises two cooperating cog wheels (not shown) to the mandrel supporting axle 22. Alternatively, this can also be accomplished with a single motor.

A switch means 34 is mounted on the supporting frame 9 so as to be contacted by each construction mandrel arm as it reaches a position perpendicular to the axis of the plastic film 12 and is located inside of the plastic film so as to close a circuit. The switch 34 is connected to the mounting mechanism of the heat bar 30 so as to cause the heat bar to drop and to make contact with the plastic film 12 when the switch 34 is activated.

The heat bar 30 which does the cutting and sealing of the plastic film 12 may be controlled by any of the many methods well known in the art, such as by having the heat bar connected to solenoid activators 35. The pin within the solenoids is connected to the heat bar 30 on the underside of the heat bar so that when the electric current is applied to the solenoid, the heat bar will be pulled down momentarily against the plastic film 12 thereby cutting the plastic film and sealing it on both sides of the cut.

In accordance with another embodiment of our invention, we modify the apparatus so as to produce bags which are not only nested one inside of another, but which are cuffed, and cuffed not individually, but cuffed as a group. In accordance with this embodiment we provide a construction mandrel 21 which is hollow inside and is preferably rectangular with a ratio of width to length of approximately seven to ten. Preferably, the circumference of the construction mandrel 21 is substantially equal to or slightly smaller than the circumference of the bag 36.

A second wheel 44 is provided having a plurality of solid receiving mandrels 38 thereon, the receiving mandrels 38 having a configuration cross-sectionally generally similar to and slightly smaller (approximately ½ inch smaller in each direction) than the interior of the construction mandrels 21. The second wheel 44 comprising the receiving mandrels 38 is located with its axle 37 parallel to the support axle 22 of the construction mandrels 21 and is disposed near the first set of mandrels so that when the construction mandrels 21 are pointed toward the axle 37 of the receiving mandrels 38 and a receiving mandrel 38 is pointed to the axle 22 of a construction mandrel 21, the receiving mandrel 38 will extend into the construction mandrel 21 approximately ½ to ⅓ of the length of a plastic bag 36. Further, in accordance with this embodiment the axle 22 of the construction mandrels 21 is located sufficiently distant from the plastic film strip 12 which is being converted into plastic bags 36 so that the hollow construction mandrels 21 extend only about ⅓ to ½ of the length of the plastic bags 36. Coordination between the two sets of mandrels may be very simply accomplished by having a guide bar mounted on each of the receiving mandrel arms which extends upward and contacts the construction mandrel arm. Thus, as a mandrel of the construction apparatus moves toward the position for contact with the receiving mandrel, the arm of the construction mandrel touches the guide bar extending from the arm of the receiving mandrel, causing the receiving mandrel to move with and into the construction mandrel so as to push the bottom of a bag into the interior of the construction mandrel. While for convenience we have shown the mandrel arms of short length, nevertheless, it is understood that for close tolerance meshing the mandrel arms should be longer, preferably at least three times the length of the work portion of the mandrel. Thus, with this apparatus the power of rotation for the receiving apparatus is provided by the rotation of the construction apparatus and therefore the receiving apparatus may be operated without an independent power source for the receiving apparatus. However, in accordance with a preferred embodiment of our invention, as shown in the drawings, the receiving apparatus is power driven.

In accordance with a further embodiment of our invention the construction mandrels 21 on which the plastic bags 36 are constructed, are hollow and have therein a nose piece 46 extending from a substantial distance inside of the mandrel, to a point near or preferably substantially beyond the mouth of the mandrel. In accordance with a preferred embodiment of our invention, the nose piece extends out beyond the mouth of the mandrel by a distance equal to between one-third and one-quarter of the length of the plastic bag. In accordance with this embodiment of our invention, the second set of mandrels act as receiving mandrels 38 rather than as cuffing mandrels. The receiving mandrels 38 comprise a hollow cylinder having a diameter slightly less than the diameter of the construction mandrels 21 and larger than the diameter of the nose piece 46 in the construction mandrel 21. The receiving mandrels 38 are designed to fit into the construction mandrel 21 when the construction mandrel has one bag thereon and to cause the bag 36 to be slipped onto the receiving mandrel 38. Since the receiving mandrel 38 will gradually build up a plurality of bags 36 thereon, it is important that the receiving mandrel and the construction mandrel 21 have sufficient space therebetween when they are in conjunction, that approximately twenty-five to fifty plastic bags 36 may be on the receiving mandrel 38 and it will still be able to move easily into and out of the construction mandrel 21. The receiving mandrel 38 is hollow so as to receive the nose piece 46 of the construction mandrel 21. The actual sizing of the construction mandrel 21, the receiving mandrel 38 and the nose piece 46 of the construction mandrel 21 is accomplished for any particular thickness and shape of bag 36, by sizing the receiving mandrel so that a nest of the desired number of bags such as twenty-five bags, fit easily inside of and are cuffed over the outside of the receiving mandrel. The nose piece 46 of the construction mandrel 21 is then sized to fit easily inside of the bags 36 on the receiving mandrel 38 and the outside cylinder of the construction mandrel is sized to slip freely over the outside of the receiving mandrel. While in the drawings we have shown the outer shell of the primary or construction mandrel 21 co-extensive with the nose 46 in the primary mandrel, nevertheless, it should be understood that such a configuration is not necessary. It is only necessary that the relationship between the outer shell, the nose, and the bag thereon, be such that when a bag is thereon reasonably tightly fitted, then the open edge of the bag should extend past the open edge of the shell by a distance of at least equal to 1½–2 times the length of the desired cuff.

With this apparatus, the bags 36 are first made on the construction mandrel 21 preferably extending a short distance beyond the construction mandrel. However, it is not mandatory that the bags 36 be constructed to extend beyond the construction mandrel 21 but instead the bags may be constructed tightly on the construction mandrel. However, in accordance with a preferred embodiment, approximately one-half of the bag 36 is on the construction mandrel 21 and the other half or the bottom half of the bag, extends beyond the construction mandrel. As the construction mandrel 21 leaves the production line and moves toward the receiving mandrels 38, one of the receiving mandrels enters the construction mandrel. As the receiving mandrel 38 enters the construction mandrel 21, it pushes the bag 36 inside the construction mandrel. In other words, the receiving mandrel 38 moves the bottom of the bag 36 first toward the construction mandrel 21 and then up into the construction mandrel. As the receiving mandrel 38 moves further into the construction mandrel 21, the nose 46 of the construction mandrel contacts the bottom of the bag 36, holding the bottom still, while the sides of the bag are gradually pulled off of the outside of the construction mandrel and are caused to slip inside the construction mandrel. As the receiving mandrel 38 extends further into the construction mandrel 21, eventually the bag 36 sides are totally removed from the outside of the construction mandrel 21 and at this point are located inside the construction mandrel and are oriented on the receiving mandrel 38, in the general configuration of a nested plastic bag 36, wherein the main body of the bag 36 lies inside of the receiving mandrel 38 and the upper edge of the bag 36 is cuffed over the outside of the receiving mandrel 38. As this process is repeated, the receiving mandrel 38 gradually increases the number of bags 36 thereon, until the desired nest of bags is complete. When the desired nest of bags 36 is on the receiving mandrel 38, as for example twenty-five bags, then the nest of bags are removed from the receiving mandrel and are ready for use.

Figures 1, 5, 6, 8, 9, 10:
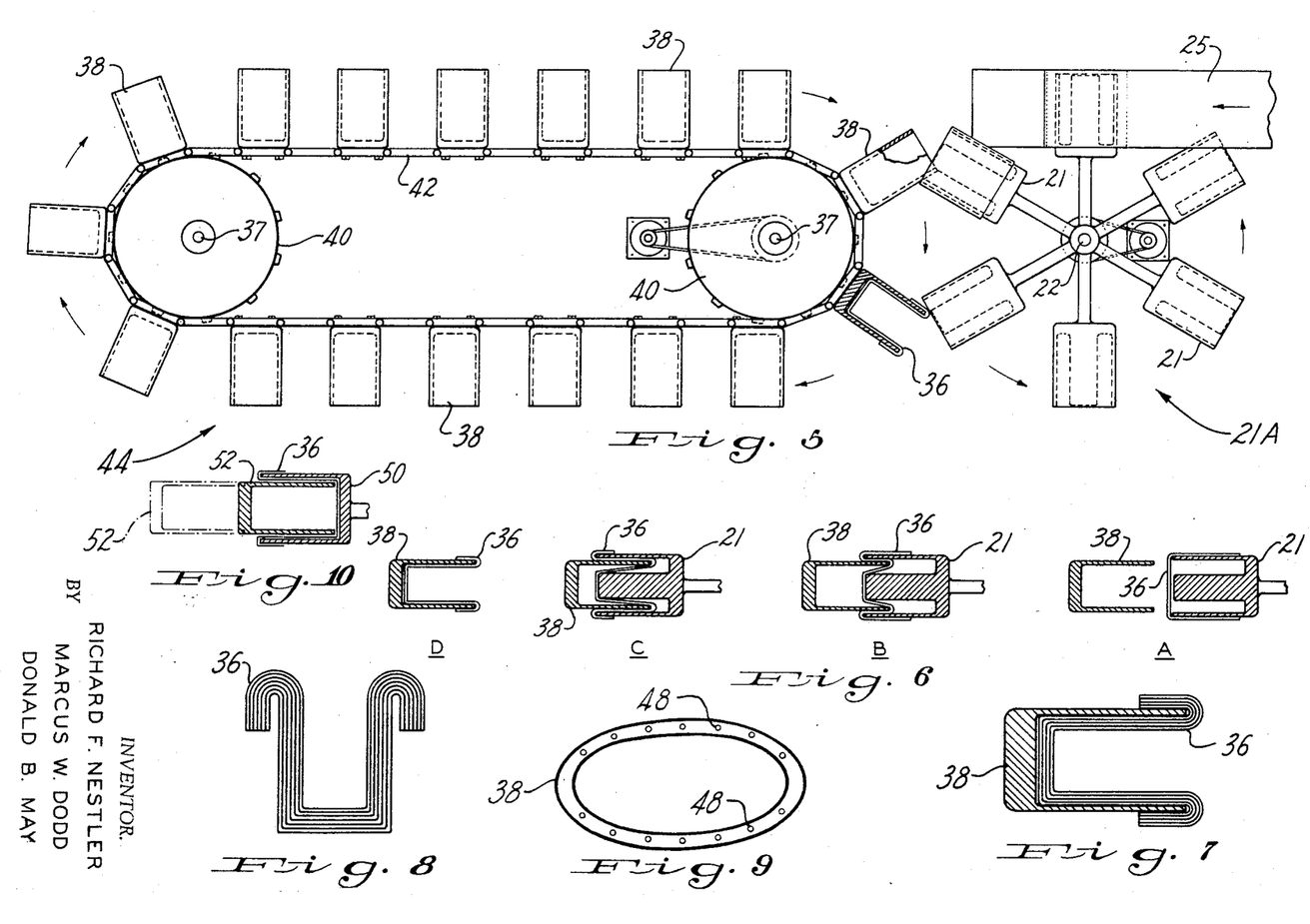
FIG. 5 is a plan view partially cut away and partially in section and partially schematic of apparatus in accordance with our invention.
FIG. 8 is a schematic cross-sectional showing of a nest of bags.
FIG. 9 is an end view of a secondary mandrel in accordance with one embodiment of our invention showing the air ejection parts in the end thereof.
FIG. 10 is a schematic showing of apparatus in accordance with one embodiment of our invention wherein the primary mandrel is hollow and the secondary mandrel is also hollow for nesting and inverting the bags on the primary mandrel instead of the secondary mandrel.

In accordance with one embodiment of our invention, the bags 36 may be removed from the receiving mandrel 38 by an operator manually removing those bags from the mandrel. However, in accordance with a preferred embodiment of our invention we provide an automatic means for removing the nest of bags from the mandrel. The automatic means for removing the bags from the mandrel employs air jets for the forcible eviction or ejection of the bags from the mandrel. In accordance with this embodiment of our invention, we provide a channel (not shown) at the end of the receiving mandrel 38 which permits the passage of air therethrough at a plurality of outlet air ports 48 in the end of the mandrel or allows air under pressure to escape therefrom to eject the nest of bags 36 from the mandrel 38. Further, we provide a channel (not shown) in the base of the mandrel 38 for additional air at a plurality of ports 48 at the base of the mandrel on the inside thereof for allowing air to move forcibly into the interior of the mandrel. Thus, by ejecting air into the interior of the mandrel 38 between the base of the bags 36 and the base of the mandrel and by ejecting air at the mouth of the mandrel against the bags, we forcibly eject the bags 36 from the mandrel 38. In accordance with our invention, the receiving mandrels 38 and the construction mandrels 21 may be constructed or mounted on a generally wagon-wheel configuration, or in accordance with another embodiment of our invention, they may be sized or mounted on plates, which comprise sections of a continuous belt, organized to load preferably about a vertical axis, although this obviously is not mandatory. Nevertheless, it is preferable that the receiving mandrels 38 and the construction mandrels 21 at their point of junction or conjunction, are moving in parallel directions so that the receiving mandrel 38 holds somewhat gently, smoothly and easily, into the construction mandrel 21.

In accordance with another embodiment of our invention, we provide a plurality of mandrels 38 mounted horizontally on a chain 42 being turned and essentially supported by two teethed sprockets 40 having their axes vertical. The chain 42 comprises a plurality of long straight horizontal sections approximately equal to the width of each of the plastic bags 36 to be produced on the machine. To each of the long straight sections or links of the chain 42, at the center thereof, we have fastened, as by welding, a mandrel 38 extending at right angles to the chain link. On each side of the path of the chain 42 in the region where the chain passes by and beyond the sealing and cutting apparatus 30, we provide two chain guide sidewall pieces which fit tightly against a portion of the chain 42 on either side of the chain, so as to hold the individual long straight sections or links of the chain in a tight, straight-line alignment. Thus, the individual mandrels 21 in the region of the cutting and sealing apparatus 30 are held in tight alignment so that the distance of the mandrel 21 from the sealing and cutting apparatus 30 at the time of sealing and cutting, is held at an exact length which will preferably not vary as much as one sixteenth of an inch between successive mandrels. By having the mandrels 21 thus oriented they are moving in a direction exactly perpendicular to their axis in the region located a distance equal to the width of a bag 36 beyond the region where the cutting and sealing takes place. Thus, since the mandrels 21 are moving perpendicular to their axis, or, stated differently, since their direction of motion is parallel with the plastic film 12 and they are perpendicular to the plastic film, they do not tend to move the strip of plastic film perpendicular to it since their entire component of movement is parallel to the long dimension of the plastic film. Just beyond the guide open bars 20 we provide cutting and sealing means 30 comprising a cutting device in the center between two sealing means or devices, one sealing means or device being located on either side of the cutting means. The cutting means may be one of several types of cutting means which are well known in the art for cutting plastic film, such as a high speed razor blade moving transversely across the plastic film. The sealing means may comprise any of the plurality of well-known sealing means which have been used in the prior art, such as a bar for heat sealing or the use of sound waves or light rays for effecting a sealing of the plastic film. However, in accordance with a preferred embodiment of our invention, we provide a single heat bar 30 which accomplishes both cutting and sealing on either side of the cut. This comprises a first large bar or back piece 30 of very high resistance metal having a linear notch or groove in the lower surface thereof and a small heat rod or wire 32 of relatively lower resistance metal located in that groove and protruding approximately $\frac{1}{16}$ inch below the back piece 30.

In the operation of our invention the plastic film 12 comes off a roll of plastic film or direct from an extruder, in a flat configuration. The plastic film 12 moves off the roll, is then continuously folded if it is not already folded, then moves through between the pulling rollers 14 which press the plastic film 12 flat and give the force for pulling the plastic film off the rollers 14. At this point the plastic film strip 12 has been folded over flat longitudinally. The plastic film 12 then passes by the opening guide bar 20 which opens the plastic film to allow the mandrels 21 to be inserted therebetween. As the plastic film 12 passes over the opening guide bar 20, the mandrels 21 move so that another mandrel 21 moves into the region between the upper and lower sides of the plastic film strip 12. Each mandrel 21, when inserted in the plastic film strip 12, moves that film strip along by pressing against the sealed end of the plastic film strip and tending to stretch that plastic film tight. Thus the mandrel 21 assists the conveyor belt 25 in causing forward motion of the plastic film strip 12. When the mandrel 21 has reached a position where it is substantially perpendicular to the long axis of the plastic film strip 12, the cutting and sealing means 30, which is now located between the mandrel 21 and the opening guide bars 20, is activated. When the cutting and sealing means 30 is activated, it moves downward cutting the plastic film strip 12 transversely and sealing on each side of the cut. Thus, the following or trailing edge of the first plastic bag 36 is sealed off, forming a bag which is now located on the mandrel 21, and at the same time the lead edge of the next or following bag 36 is sealed. The finished bag 36 now located on the mandrel 21 is moved forward as the mandrels rotate and the long strip of plastic film 12 having its end sealed moves forward under the action of the pulling rollers 14, the conveyor belt 25, and the next mandrel 21. It will be noted that the guide bars 20 preferably comprise a pair of powered rollers of small diameter thus giving an added impetus motion to the plastic strip 12. Since the mandrel 21 is inside the plastic film strip 12 and pressing against the end of the film strip, the mandrel itself exerts a positive tension upon the film strip thereby also tending to cause the motion of the plastic film strip. It will be noted that the pair of rollers 14 which pull the plastic film 12 from the roll of plastic film may continue on an uninterrupted basis because the entire motion is continuous except for the momentary stopping during cutting and sealing 30. While there is a short period during which the sleeve of plastic film 12 must be stationary at the point of sealing and cutting 30, during such sealing and cutting, nevertheless, it will be noted that whatever stoppage is caused by the sealing and cutting operation is easily picked up again by the next moving mandrel 21 which moves into the interior of the plastic film strip and pulls against the end of the plastic film.

It will thus be seen that all of the components in the operation except the actual cutting and sealing devices move in a continuous and nonreciprocating manner. It will be noted that while the cutting and sealing means 30 tend to cause instantaneous pauses in the movement of the film strip 12, they once within the stretch limits of the plastic film end, do not interfere with the continuous motion of the other parts of the apparatus, so that as a totality, the assembly line moves in a substantially smooth continuous nonreciprocating manner in order that a very high rate of production may be maintained.

It will be noted as is shown in FIG. 10 that in accordance with one embodiment of our invention, it will be desirable that the bags be both nested and inverted. In accordance with this embodiment the primary mandrel 50 is hollow and has no nose piece therein. A bag 36 is produced on the primary mandrel 50 and then moves around to a position in conjunction with the secondary mandrel 52 where the bottom portion of the bag 36 is pushed up inside of the primary mandrel so that the bulk of the bag is located inside of the primary mandrel and a cuff hangs over the outside of the primary mandrel. The primary mandrel 50 with a bag 36 on it then continues back into the production line since the secondary mandrel 52 has not removed a bag therefrom. The primary mandrel 50 with a bag 36 on it then moves into position inside of the strip of film plastic 12 and another bag is constructed on top of it. It will be noted that in such a configuration where succeeding bags are produced one after another on the same mandrel, each succeeding bag will be slightly larger than the preceding bag because the lead edge of the strip of film is moved further forward by the preceding bags on the mandrel. Under some conditions this is advantageous in making it easier to remove the bags. It is also understood that in this embodiment, if so desired, the cutting and sealing bar 30 can be successively moved up the assembly line away from the mandrel 50 until the desired number of bags 36 are on the mandrel and then returned to the starting point, so as to produce each succeeding bag even larger than the preceding bag and further, to eliminate any possibility of sealing a bag to the preceding bag. In this embodiment the secondary mandrel 52 may be either a hollow cylinder or it may be a solid mandrel.

When the required number of bags 36 is on the mandrel then the nest of bags can be removed by several methods, such as by moving air up from the primary mandrel 50 against the bag to cause it to be ejected.

In accordance with one embodiment of our invention, apparatus of our invention can be modified to produce bottom gusseted bags. In this embodiment, we provide a pair of internal folding guide bars inside the plastic and an external folding guide bar extending into the region between the internal guide bars so as to continuously fold the bottom edge of the plastic strip inward. With the strip folded in this manner, a bottom gusseted bag will be produced when the strip of plastic is sealed and cut laterally.

Figures 11, 12, 13, 14, 15:
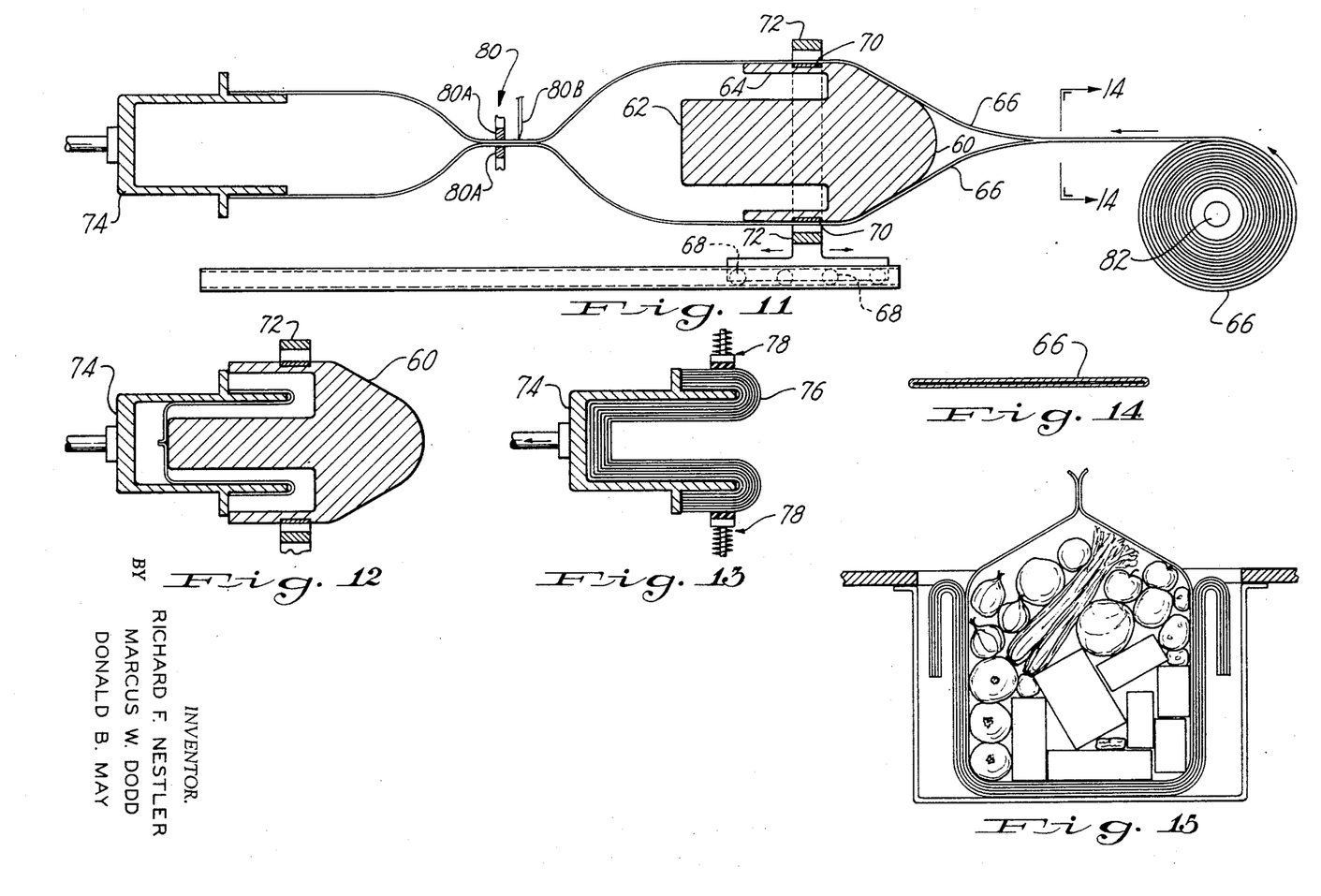
FIG. 11 is an elevational view of apparatus in accordance with our invention showing the two mandrels at their point of maximum separation.
FIG. 12 is a showing in cross-section of part of the apparatus in FIG. 11 showing the two mandrels in their time of deepest penetration.
FIG. 13 is a showing in cross-section of the receiving mandrel having a plurality of plastic bags nested and cuffed thereon.
FIG. 14 is a showing in cross-section of the sleeve of plastic taken along the line 4—4 of FIG. 11.
FIG. 15 is a showing in cross-section of a plurality of nested bags in actual use in a grocery store take out counter.

In accordance with another embodiment of our invention we provide a hollow mandrel 60 which is in the general nature of a flying shuttle or floating mandrel. The floating mandrel 60 is of generally hollow cylindrical shape and has a solid cylindrical nose piece 62 located coaxially therein. The nose piece 62 preferably protrudes a short distance beyond the shell 64 of the floating mandrel and by a distance equal to one-third of the diameter of the floating mandrel 60. The floating mandel 60 is located inside of the plastic sleeve of the plastic film 66 as the film comes off of a roll. The floating mandrel 60 moves along inside the sleeve of plastic 66 as the sleeve of plastic advances. The floating mandrel 60 is provided with rollers 68 so as to reduce the friction between the floating mandrel and the sleeve of plastic 66 and immediately beneath the floating mandrel there are provided a number of rollers 68 which either directly contact the plastic or else activate and support a conveyor belt (not shown) which in turn supports the plastic and in turn the floating mandrel 60. The floating mandrel 60 is preferably maintained in lateral position by the use of a magnetic material 70 mounted in the mandrel and a magnet 72 located external to the plastic sleeve which holds the mandrel in a predetermined location. Alternatively, it is understood that the floating mandrel 60 may be maintained in position by employing gravitational forces (not shown) for the control of the position of the floating mandrel. This may be accomplished by arranging the supporting rollers 68 and the conveyor belt (not shown) underneath the floating mandrel 60 so as to provide a depression into which the mandrel will naturally tend to roll.

Opposite and beyond the floating mandrel 60 and aligned axially with the axis of the floating mandrel, we provide a receiving mandrel 74 which is mounted so as to move reciprocally along the axis of the two mandrels. The receiving mandrel 74 is of cylindrical shape and is substantially smaller than the floating mandrel 60 and is designed to receive the plastic bags 76 and to easily fit inside of the floating mandrel when a complete roll of plastic bags is located thereon. The receiving mandrel 74 preferably is constructed with an expansible outside shell (not shown) so that it may be expanded so as to expand the first plastic bag applied thereto to substantially the full size of the bag and to successively move smaller or collapse as more bags 76 are added to it. This can be accomplished best in accordance with the preferred embodiment of our invention by providing a spring biased expansive member of generally cylindrical shape which expands outward in both directions so as to maintain or tend to maintain the bags 76 in a generally distended configuration. The receiving mandrel 74 is hollow so as to allow bags to be indented therein.

Inside of the floating mandrel 60 the floating mandrel is built so as to be somewhat shorter than the receiving mandrel 74 so that as the receiving mandrel goes into the floating mandrel, the main body of the bags which is already on the receiving mandrel will be compressed preferably about two inches so as to keep it completely out of the way of the succeeding cutting and sealing actions which will occur later. Preferably the floating mandrel 60 is constructed with the nose 62 inside thereof of substantially smalled diameter than the outside diameter of the mandrel. Likewise the receiving mandrel 74 is also constructed with a hollow nose. The solid nose piece 62 inside of the hollow floating mandrel 60 extends out beyond the outer rim of the floating mandrel so that it will depress the plastic bags 76 on the receiving mandrel 74 to the depth beyond the distance to which the bags attach on the outside of the receiving mandrel.

External to the receiving mandrel 74, we provide gripping means 78 for pressing the plastic bags 76 against the receiving mandrel. This is preferably in the form of arms having rubber or some other surface on them which provide a high coefficient of friction between the arm and the plastic sleeve. These arms 78 are mounted in direct connection to the mandrel 74 so as to move laterally and axially with the mandrel back and forth.

The end of the sleeve of film 66 may be moved onto and back with the secondary mandrel 74 by several means such as gripping arms 78 attached to the secondary mandrel 74 which press against the film on the outside of the floating mandrel 60 and move the mouth of the film 66 off of the primary mandrel onto the secondary mandrel 74 as the two mandrels separate. Also a continuous conveyor may be used which presses against the sides of the floating mandrel and urges the film forward toward the secondary mandrel.

Preferably both the floating mandrel 60 and the secondary mandrel 74 move toward each other and away from each other with respect to a coordinate system based on the main body of the sleeve of film 66. Thus, at the time of cutting and sealing of the film, the plastic sleeve 66 extends beyond the floating mandrel 60. Then the two mandrels move together, the floating mandrel moving to the mouth of the sleeve of plastic and the secondary mandrel 74 moving into the floating mandrel. Thus the plastic sleeve 66 is kept moving continuously and constantly except for the monetary halt during cutting and sealing.

It is also understood that the floating mandrel 60 may be held still and an oscillating conveyor move the film 66 back and forth past the floating mandrel.

Located generally between the floating mandrel 60 and the receiving mandrel 74, we provide a cutting and sealing mechanism 80. The cutting and sealing mechanism is of any of a large number of well-known types in the art. Preferably the sealing means 80A comprises a bar from below meeting a bar moving down from above and incorporating an electrical heating means (not shown) for partially melting the plastic film 66 and sealing it together. Coordinated with and adjacent to the sealing bar on the side of the sealing bar toward the floating mandrel 60 and the roll of plastic 66, we provide a cutting apparatus 80B. The cutting apparatus 80B may comprise a razor blade mounted on a high-speed intermittent belt (not shown) which is so mounted that when the sealing bars 80A close against each other the cutting belt is activated and the razor blade is caused to move rapidly across the plastic so as to shear it in a substantially instantaneous manner. Central connections are provided between the sealing device 80A and the mandrel comprising a switch (not shown) activated by the receiving mandrel 74 to cause the cutting and sealing device to be activated.

We shall describe the cycle starting at the time one bag is completed. The receiving mandrel 60 has now located thereon a plurality of previously constructed plastic bags 76 and one bag which has not been completed extending outward beyond the nose 62 thereof. The receiving mandrel 74 now moves into the floating mandrel 60 until it reaches a point where the plastic bags 76 on the receiving mandrel have the upper edge of their mouth exactly even with the edge of the opening of the floating mandrel.

As the receiving mandrel 74 moves into the floating mandrel 60 the last bag 76 placed on the receiving mandrel is indented and forced partially inside of the receiving mandrel by the nose 62 on the floating mandrel.

When the two mandrels are located one inside of the other with the maximum predetermined penetration, the rubber tipped arms 78 connected to and external to the receiving mandrel 74 are actuated so as to move against the plastic sleeve 66 on the outside of the floating mandrel 60 so as to engage the sleeve of plastic and to press it against the outside of the floating mandrel. As the receiving mandrel 74 withdraws from the floating mandrel 60, the friction gripping arms 78 on the outside move with the receiving mandrel causing the plastic sleeve 66 to slide along the floating mandrel surface and to drop onto the receiving mandrel and to be pressed against the receiving mandrel 74 when the friction arms 78 move beyond the floating mandrel 60. As the receiving mandrel 74 moves further away from the floating mandrel 60 with the arms 78 pressing the plastic sleeve 66 against the receiving mandrel, the sleeve of plastic is drawn along over the surface of the floating mandrel 60 until the receiving mandrel 74 is spaced with its nose distant a substantial distance preferably at least three inches from the central nose 62 of the floating mandrel. However, the actual distance that the receiving mandrel 74 and the floating mandrel 60 are separated at this point is governed by the fact that as the cutting and sealing members 80 move down from above just prior to cutting off the plastic 66 they move or cause the separation to be accentuated between the receiving mandrel 74 and the floating mandrel 60 but they must not seal the plastic to the nose 62. This occurs at the time that the receiving mandrel and the floating mandrel have reached a maximum point of separation in the normal cycle. The cutting and sealing devices 80, which are cutting and sealing devices normally used in the handling of plastic and are one of several types well known to any person skilled in the art and which preferably comprise a heat sealing bar 80A from below so as to produce a thermal seal, and a cutting means 80B, which comprises pressing means preferably located above and a cutting means preferably located below the plastic sleeve 66, such as a high speed knife or razor blade, which quickly moves across the plastic when it is in a pressed condition so as to sever the plastic. As the cutting and sealing means 80 move downward, if there is insufficient separation between the two mandrels since the nose 62 of the floating mandrel 60 is substantially rounded or cone-shaped, the cutting and sealing means 80 will tend to force the floating mandrel 60 away from the receiving mandrel 74. When the cutting and sealing means 80 has finished cutting and sealing the bag 76 which has been placed on the receiving mandrel 74, the support mechanism for the floating mandrel is tilted slightly causing the floating mandrel 60 to move forward approximately four inches to pick up the slack plastic 66 extending from the nose 62 of the floating mandrel to the point of severance of the plastic sheet. It is also understood that as an alternative the plastic sleeve 66 may be depressed between the floating mandrel 60 and the roll of plastic 66 while controlling the rate of flow of the plastic from the reel 82 so that the sleeve is caused to move backwards about six or eight inches over the surface of the floating mandrel so as to bring the lead edge of the plastic back to substantially the edge of the floating mandrel.

The receiving mandrel 74 now moves toward the floating mandrel 60 and the nose 62 of the floating mandrel now pushes the sealed end of the bag 76 which has just been produced partially into the receiving mandrel. When the receiving mandrel 74 is fully inserted into the floating mandrel 60 the cycle is completed and the apparatus is now ready to start the next cycle for the production of another plastic bag 76. When 20 to 50 bags have been constructed and nested on the receiving mandrel 74 the nest of bags 76 is ready for removal. This may be accomplished by removing the mandrel and replacing it by another mandrel as for example employing a plurality of mandrels on a turnstile rotating about a vertical axis so that when a mandrel is loaded with bags the turnstile is rotated 90 degrees and a new mandrel is placed in the assembly line. This allows an operator time to remove the bags from the loaded mandrel.

As another alternative, we provide that at the end of the 20th or other predetermined stroke, an ejector mechanism (not shown) moves in and holds the nest of bags 76 in a stationary position while the receiving mandrel 74 is caused to move backward until the bags are completely free of the receiving mandrel and the ejection device then removes the nest of bags from the assembly line by a lateral movement perpendicular to the main axis of the assembly line. Preferably this ejection procedure is co-ordinated so as to happen immediately following a cutting and sealing stroke. Thus the sheath of plastic bags 76 which is ejected will comprise 49 bags which are cuffed around the outside of the cone and are indented inside of the cone and one bag, which is the last bag constructed, is cuffed around the outside of the cone but is not indented inside of the cone. This produces an irregularity which may be useful in some circumstances and will not interfere with the use of the bags at the point of end use.

In accordance with one process of our invention we have found that plastic bags can be successfully and neatly nested one inside of another by employing a mandrel comprising at the end thereof a flat plate or surface with rounded corners, the plate with rounded corners being approximately 10 inches in length by 7 inches in width for a side gusseted bag of cross-sectional dimensions of 10 inches by 6 inches, or corresponds directly to the size of the bags to be nested. When the process is done by hand, we have found that the best procedure for nesting bags is to first count out the number of bags to be put in the nest of bags before actually starting to nest them. For example, if 25 bags are to be placed in a nest of bags, 25 bags would then be counted out and put in a pile accessible to the nester. The mandrel is set upright and is positioned in front of the nester so that the length of the flat plate with rounded corners is directly parallel with the nester. The nester takes one bag off of the top of the pile of bags, opens it slightly with the fingers and proceeds to pull the bag or push the bag down over the top part of the mandrel until the bag is completely seated on the mandrel. This is accomplished by taking the open of the bag and starting it over the edge of the end of the mandrel and with a downward motion pulling the bag down until the bottom of the bag is seated against the top of the mandrel. Before the next bag is placed over top of the first bag on the mandrel, the first bag is straightened so as not to have any folds or wrinkles in the bottom edge of it. At this time the second bag is then placed over top of the first bag in the same manner as the first bag was put onto the mandrel.

This process is repeated until the 25 bags that have been previously counted out to be put in the nest are nested. When all 25 bags have been nested one on top of the other, they are straightened at the bottoms of the bags by inserting the hands into the bottoms of the bags lengthwise and snapping the bags, so to speak, so that they are all closely together. When the bags are all closely together in this manner, the thumbs can be placed on the group of bags about the depth of the cuff desired (a distance of about 4 inches up from the bottom edge of the bags) and with an upward bending motion the bags are folded outwardly or cuffed backward toward the bottom part of the bags. The bags are cuffed in this manner all the way around the perimeter of the bags and when the cuffed portion of the bags is in position, it can be locked into this position by snapping the bags again, then straightening out the cuff so as to have each cuffed bag flat against the other, to give the impression of having just one bag cuffed instead of 25. After the cuffs are straightened on the nest of 25 bags, the bags are removed from the mandrel or the plate by inserting one arm up inside the nest of bags and placing the hand flat on the top of the mandrel, and in the same motion lifting the bags and pushing to one side lengthwise on the mandrel so as to remove the nest of bags from the mandrel.

When the nest of bags is removed from the mandrel, both hands are inserted into the nest of bags, one on each side of the bags. In this position the arms can be extended outwardly so that the bottom portion of the bags will collapse in a flat manner which will maintain the flat configuration of the bottom part of the nest of bags. The hands are then removed from the inside of the nest of bags and the flat bottom portion of the bags which has a natural tendency to fold over on one side towards the cuffs of the bags, is pushed flat with the hands. In other words, after the hands are removed from the nest of bags, any air entrapped internally in the nest of bags can then be removed by pushing on the flat bottom portion of the bags and in the same motion the bottom of the bags can be straightened somewhat so as to give a neat appearance. When most of the air has been dissipated from within the bags, the cuffing then can be restraightened so as to look like one cuffed bag. The nest of bags is now ready for use.

The drawings in this application have been prepared to show apparatus which we have invented for carrying out most of this process by automatic machinery.

Figures 16, 22, 23, 24, 25:
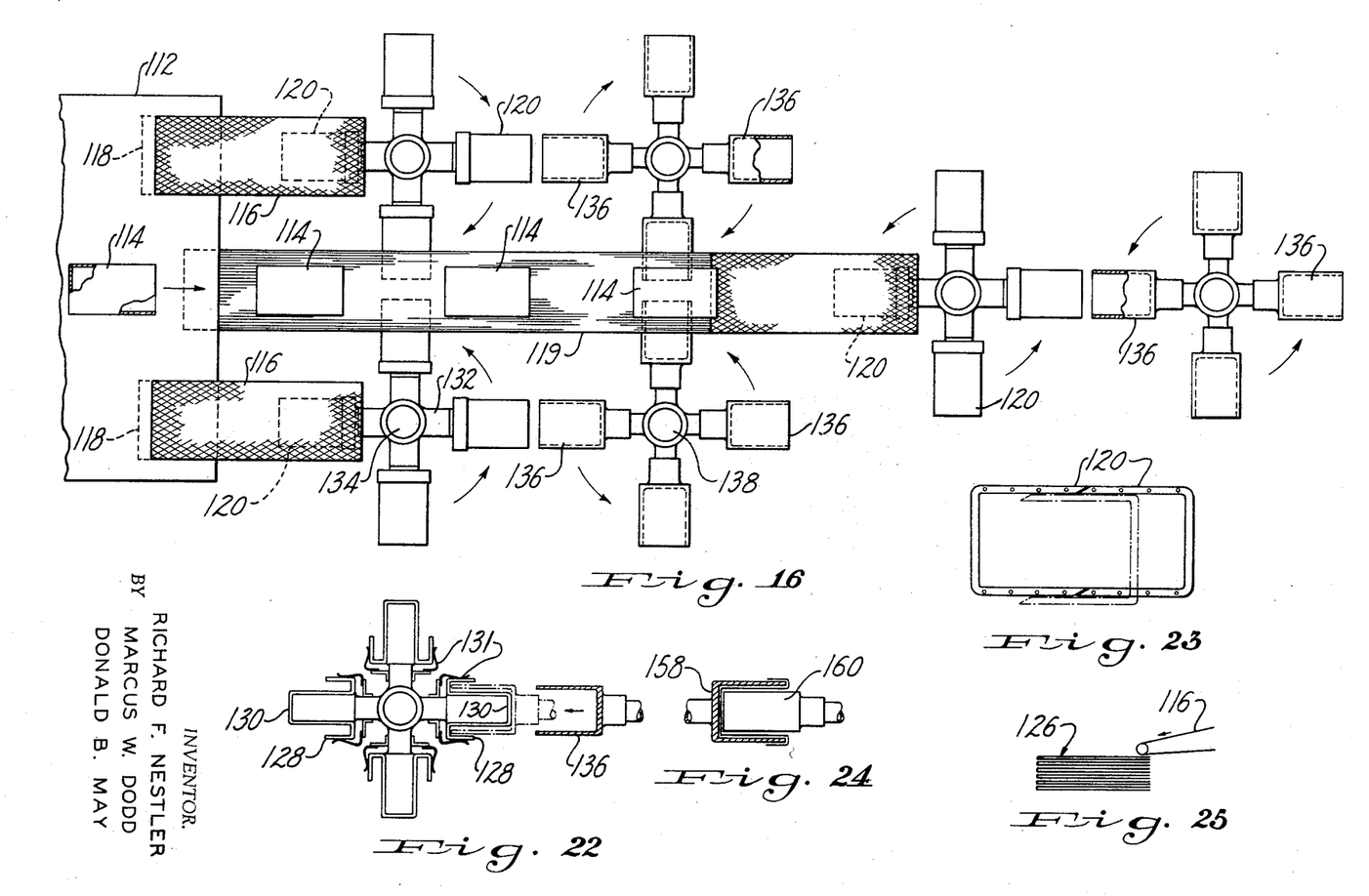
FIG. 16 is a plan view of nesting apparatus in accordance with our invention.
FIG. 22 is a schematic plan view of a group of primary mandrels and a schematic showing of the movement of the secondary mandrel into conjunction with a primary mandrel.
FIG. 23 is a schematic showing of the end of a primary mandrel in accordance with our invention demonstrating and illustrating a manner in which the two halves of the mandrel may move together when the mandrel is collapsed.
FIG. 24 is a schematic showing of apparatus in accordance with one embodiment of our invention wherein the primary mandrel is hollow and the secondary mandrel is solid for nesting the bags on the primary mandrel instead of the secondary mandrel.
FIG. 25 is a schematic showing of apparatus in accordance with our invention for removing bags from a stack of flat bags.
Figures 17, 18:
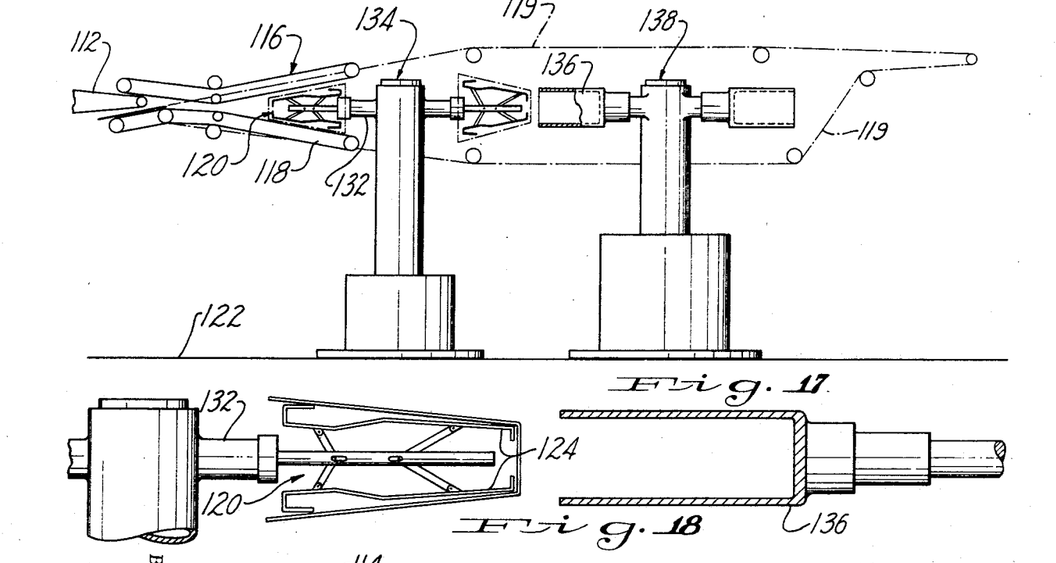
FIG. 17 is an elevational view of apparatus in accordance with our invention.
FIG. 18 is an elevational view partially in section of a primary mandrel with a plastic bag thereon and a secondary mandrel positioned to be moved into conjunction with the primary mandrel.

According to our invention, we provide a standard plastic bag manufacturing machine 112 such as the machine manufactured by G. T. Schjeldahl Co. of Providence, R.I., described by it in its publications as 208–56–TA. The bags 114, if they have been produced from a sleeve of plastic, come off of this machine 112, with the mouth of the bags 114 pointed actually toward the discharge end of the machine. The bags 114 are customarily carried off on cloth belts which support the bags and move them off of the machine. These cloth belts consist of a plurality of belts approximately one inch wide and are equally spaced apart along the width of the machine.

In accordance with our invention, we provide two conveyor systems, or systems of suction belts, comprised of a conveyor 116 above and a conveyor 118 below the bag 114. The bottom conveyor 118 is built with a plurality of belts to mesh into and fit beween the belts on the primary machine 112, so that the second set of belts 118 can remove the bags 114 from their location on the belts of the primary machine 112. Alternatively, the lower set of belts 118 are somewhat longer than the upper set of belts 116 and the lower set of belts extend under a portion of the primary machine 112 so that the bags 114 fall onto the lower set of belts 118. The two sets of receiving belts 116, 118 have a plurality of suction cups (not shown) thereon for gripping the plastic bags 114. Alternatively, instead of using suction cups, a vacuum apparatus may be employed and also surfaces that have a slight affinity for the plastic bags, such as a sticky material, or a material having an electro-static charge thereon. These suction belts 116, 118 grip the plastic bag 114 and have a natural tendency to hold the plastic bag to them. The two sets of belts 116, 118 are oriented so that the upper and lower set of belts come together in a region near the end of the primary machine 112 and then are disposed further and further apart as the distance from the primary machine increases. Thus, since the two sets of belts 116, 118 above and below the bag 114 have an affinity for the bag and since the two sets of belts are moving diverging paths, they tend to pull the sides of the bag apart, thereby opening the bag.

In between the belts 116, 118 we provide a primary receiving mandrel 120 which is collapsible and is in a collapsed position so that the bag 114 moving off of the primary machine 112 and in between the suction belts 116, 118 is spread apart by the suction belts and easily moved onto the primary receiving mandrel 120.

While in the schematic showings of our invention, the suction conveyors 116, 118 are shown as having a flat cross-section, nevertheless it is understood that it is preferable that the conveyors be laterally flexible as well as longitudinal and that they be flat as they pick up a bag 114 and curve generally to the configuration of the collapsed mandrel 120 as they approach the mandrel.

The primary receiving mandrel 120 is mounted to the floor 122 or to a supportive frame extension (not shown) from the discharge end of the primary machine 112 and is synchronized with the primary machine, so that when the cutting and sealing means is engaged on the primary machine, the primary receiving mandrel 120 is moved out of position between the suction belts 116, 118 and another primary receiving mandrel 120 is moved into position ready to receive the next bag 114.

The primary receiving mandrel 120 comprises effectively two cooperating pieces 124, each being in width equal to the width of the plastic bag 114 when opened to a generally rectangular shape. The primary mandrel 120 or construction mandrel which receives the bags 114 from the bag-making machine 112, or alternatively, from a stack of bags, 126, is constructed so as to be collapsible so that while it is receiving a bag 114 thereon it is in the collapsed condition and receives the bag easily over top of it. The primary mandrel 120 preferably comprises an outer wall 128 and an inner nose 130. The outer wall 128 is preferably substantially shorter than the inner nose 130 and is spaced therefrom. The realationship between the outer wall 128 or shell and the inner nose 130 of the first or primary mandrel 120, should be such that when a plastic bag 14 is seated over the nose 130 of the mandrel the bag will extend over or past the front edge of the outer shell 128 of the mandrel by a distance equal to 1½ to 2 times the length of the desired cuff on the plastic bags 114 when nested and cuffed ready for use.

In accordance with a preferred embodiment of our invention, we provide clamps 131 which clamp against the bag 114 after it has been placed on the primary mandrel 120 for holding the bag in position during rotation of the hub 134 of the primary mandrels. The retaining clamps 131 for the primary mandrel 120 are preferably flexible metal pieces that extend out from the base of the primary mandrel and are in contact with the outer shell 128 of the primary mandrel when it is expanded and are spaced from the outer shell 128 of the primary mandrel when it is collapsed. Thus, since the primary mandrel is in a collapsed condition when the bag 114 is inserted thereon, the bag moves over the primary mandrel and under the clamps 131. When the primary mandrel 120 is expanded, the walls of the shell 128 move outward and thus clamp the mouth of the bag 114 between the clamps 131 and the outer shell 128 of the primary mandrel 120. These clamps 131 aid in holding the bag 114 in position where high speed operation is necessary and therefore quick rotation of the primary mandrels 120 is maintained.

The mandrels are mounted on mandrel arms 132 which in turn are attached to a hub 134 for rotating the mandrels. Preferably four mandrels are mounted on one hub 134 at 90 degrees to each other. The hub 134 is connected to a power source (not shown) and is coordinated if the bags 114 are being taken directly from a bag-making machine 112, with the action of the cutting and sealing means on the bag-making machine. The hub 134 of the primary mandrels 120 is coordinated with the cutting and sealing means so that as the cutting and sealing means is actuated, the hub is rotated 90 degrees so as to place a new mandrel in position to receive a bag 114 from the bag-making machine 112. If the bags are being taken not directly from a bag-making machine but instead are being taken from a stack of bags 126, then the upper suction conveyor 116 is caused to move down against the stack of bags 126 long enough to pick up a bag and to move it off of the stack. In this configuration, when the hub 134 has rotated and comes to a stop with the next mandrel 120 toward the suction conveyor system 116, 118, then it actuates the upper suction conveyor 116 to move down in contact with a bag to start a new bag moving toward the primary mandrel. Preferably the upper conveyor 116 extends over a stack of bags 126 approximately 3 inches so that it has sufficient area of contact to grab hold of the bag and to start the bag moving, but does not extend sufficiently far back so as to start a plurality of bags moving in the same cycle.

Secondary or receiving mandrels 136 are provided for receiving bags 114 from successive primary mandrels 120 until the desired number of bags 114 in a nest of bags is on the secondary mandrel 136. In accordance with a preferred embodiment of our invention, as shown in the drawing, we provide four secondary mandrels 136 mounted on a common hub 138. The secondary mandrels 136 have parallel sides and are similar in shape to the primary mandrel 120 and larger than the inner nose 130 of the primary mandrel. Thus the secondary mandrels 136 are shaped to mesh with the primary mandrel 120. The secondary mandrel 136 will therefore fit over the nose 130 of the primary mandrel 120 and a substantial distance under or inside of the outer shell 128 of the primary mandrel.

Figures 19, 20:
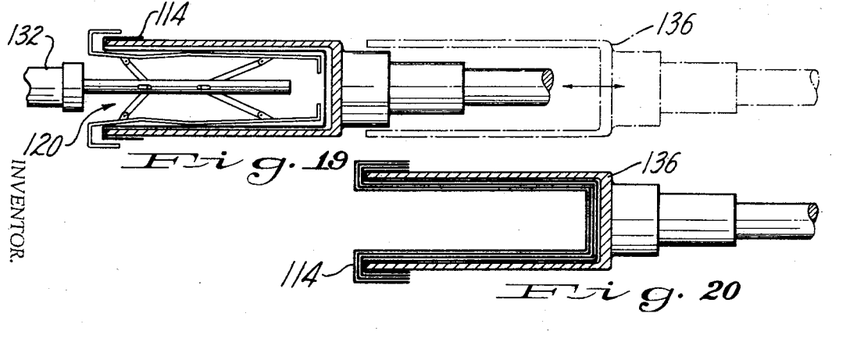
FIG. 19 is a showing, partially in cross-section, of the apparatus shown in FIG. 18; in which the motion of the secondary mandrel is shown as it moves into conjunction with the primary mandrel to receive the bag.
FIG. 20 is a showing of the secondary mandrel shown in FIG. 19 after it has withdrawn with a few bags thereon.

The secondary mandrels 136 are mounted and connected to the primary mandrels 120 so that a secondary mandrel will move into a position of axial alignment with a primary mandrel and then in a reciprocating motion it will move onto the primary mandrel so as to receive from the primary mandrel the plastic bag 114 on the primary mandrel and then withdraw from the primary mandrel with the bag thereon. The secondary mandrel 136 will remain stationary while the primary mandrel 120 moves on and another primary mandrel having a bag 114 thereon moves into axial convergence with the secondary mandrel. At this point the secondary mandrel 136 is again activated and moves forward to grasp the next bag 114 from the primary mandrel 120.

Figure 21:
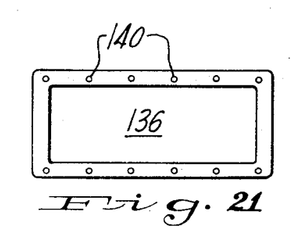
FIG. 21 is a schematic showing of an end view of the secondary mandrel shown in FIG. 18.

The secondary mandrel 136 is provided with an air channel near the front edge and a plurality of airports 140 for ejecting air therefrom on the front edge of the secondary mandrel. These air holes 140 are to provide air jets for ejecting the nest of bags from the mandrel when the desired number of bags 114 are nested and cuffed thereon.

In accordance with one embodiment of our invention where a plurality of bags 114 is being produced at the same time as, for example, three, and the bags 114 are being taken directly from the machine 112 and nested, then we provide three primary mandrels 120 with their associated vacuum conveyors 116, 118 and secondary mandrels 136. Where there is sufficient space, these three may be spaced along a common line or where there is not sufficient space then they may be staggered with the center one further from the machine 112 or closer to the machine than the two outer mandrel systems.

The center line conveyor 119 transports the bag 114 to a point where the vacuum conveyors 116, 118 grasp the bag 114, open the bag and pull the bag onto a primary mandrel 120. The center line conveyor 119 is synchronized so that the bag 114 thereon is grasped by the vacuum conveyors 116, 118 to pull the bag onto the primary mandrel with the same relative sequence as the two outboard bag-nesting systems perform this operation. Thus, in accordance with this embodiment of our invention, one bag-making machine 112 may have attached thereto three bag-nesting systems.

In accordance with the operation of a preferred embodiment of our invention, where we are taking bags from a stack of plastic bags 126, the bags are taken off of the stack by the suction conveyor 116 which extends only about three inches over the edge of the stack of bags 126. Thus, the upper conveyor 116 grasps and starts a bag 114 moving toward conjunction with the lower conveyor 118 gradually grasping the bag further and further back from the front edge of the bag. At the time that the upper conveyor 116 reaches a point near the rear edge of the bag 114, the upper conveyor raises off of the bag stack 126, so that no further bags are removed from the stack until the conveyor is activated again. As the bag 114 moves between the two conveyors 116, 118, the suction cups on the conveyors grasps the bag and as the bag moves onto a point where the conveyors 116, 118 are separated, the bag is pulled open. Thus the bag 114 is gradually opened as it moves further along between the two conveyors 116, 118 until in an open condition it moves over the nose 130 and then over the outer shell 128 of the primary mandrel 120. When the bag 114 is firmly seated over the primary mandrel 120, the nose 130 of the primary mandrel will cause it to stop in its forward motion.

The primary mandrel 120 then expands to substantially the full size of the bag 114 so that the retaining clamps 131 now hold the bag in place against the outer shell 128 of the primary mandrel and the primary mandrel is now ready for rotation.

At this point the hub 134 containing the four primary mandrels 120 is rotated and a next mandrel without a bag thereon moves into position. The primary mandrel 120 with a bag 114 then moves to a position away from the suction conveyors 116, 118 and at either its first, second or third stop thereafter moves into alignment with a secondary or nesting mandrel 136. A secondary mandrel 136 is then activated and moves in over the primary mandrel 120 having a bag 114 thereon. As the secondary mandrel 136 moves over the nose 130 of the primary mandrel 120, it pulls the plastic bag 114 slightly in its direction of motion and places the plastic bag slightly toward the nose of the primary mandrel. As the secondary mandrel 136 moves further onto the primary mandrel nose 130 and reaches a point where it begins to go inside of the outer shell 128 of the primary mandrel 120, the portion of the plastic bag 114 over the outer shell 128 of the primary mandrel 120 begins to slip off and to feed under the outer shell of the primary mandrel. The secondary mandrel 136 continues on over the nose 130 of and into the outer shell 128 of the primary mandrel 120 until the portion of the plastic bag 114 which was on the outer shell 128 of the primary mandrel 120 has been moved inside of the outer shell of the primary mandrel, which automatically forms a cuff over the outside of the secondary mandrel 136.

At this point the secondary mandrel 136 starts to withdraw from the primary mandrel 120. After the secondary mandrel 136 is withdrawn from the primary mandrel 120, a distance of no less than the length of the outer shell 128 of the primary mandrel, the primary mandrel then collapses. This assists the secondary mandrel having a plastic bag 114 thereon which is also cuffed over the outside of the secondary mandrel, to withdraw freely from the primary mandrel without any tendency for the bag to adhere to the primary mandrel.

In accordance with another embodiment of our invention, air is provided in the inside of the shell 128 and the nose 130 of the primary mandrel 120 at the time that the secondary mandrel 136 begins to withdraw to further encourage the bag 114 to move freely away from the primary mandrel.

This process is repeated until the secondary mandrel 136 has the desired number of bags 114 thereon, e.g., 25 bags, at which time the secondary mandrels are rotated and an empty secondary mandrel is placed in position to receive bags. The secondary mandrel 136 which is loaded with bags 114 moves to a position for deposition of the stack of nested bags thereon. The bags 114 are removed from the secondary mandrel 136 by the ejection of air under the cuff which blows the bags off of the secondary mandrel. The removal of the bags from the secondary mandrel may, of course, be enhanced by providing air toward the base of the interior of the secondary mandrel, in addition to air under the cuff.

In accordance with one embodiment of our invention, the primary mandrel 120 while collapsed remains positioned between the vacuum conveyors 116, 118 until a plurality of bags 114, such as 25 bags, are placed thereon. The primary mandrel 120 then expands so the plurality of bags 114 are held in place by the retaining clamps 131, then rotates to either its first, second or third stop, to a position in direct alignment with a secondary or receiving mandrel 136. At this time the secondary mandrel 136 is actuated and moves in over the primary mandrel 120, so as to receive the plurality of bags 114 thereon in a nested and cuffed configuration. The secondary mandrel 136 now having the plurality of nested and cuffed bags 114 thereon, withdraws from the primary mandrel 120 and rotates to a position for unloading. Thus instead of singly nesting and cuffing a bag 114 we nest and cuff a plurality of bags as a group.

Figure 26:
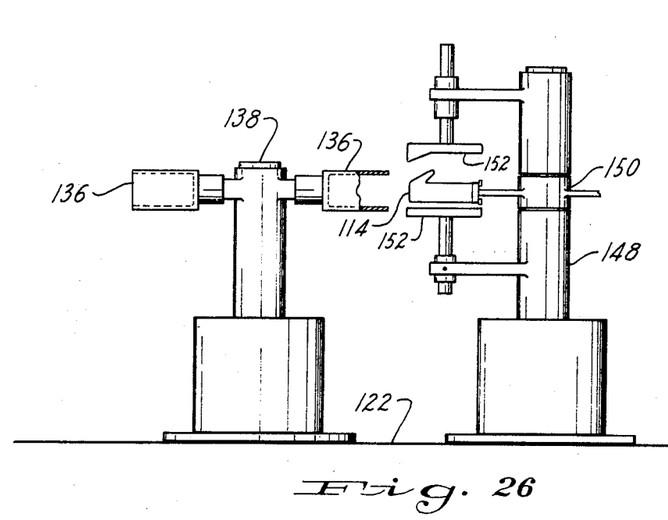
FIG. 26 is an elevational view partially in section of folding apparatus in accordance with our invention.
Figure 27:
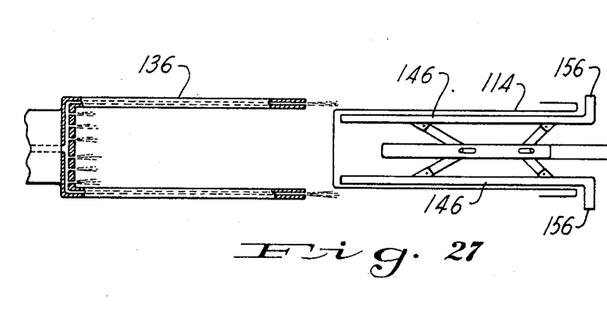
FIG. 27 is an elevational view partially in section and partially schematic of a secondary mandrel and the expandable rod arms with a nest of bags thereon.

In accordance with another embodiment of our invention, we provide two expandable rod arms 146 that extend from a vertical stand 148 which is mounted to the floor 122 in a position of direct axial alignment to the secondary mandrels 136. The vertical stand 148 is stationary with the exception of the expandable rod arms 146 which are mounted on the rotating hub 150 of the vertical stand. Above and below the expandable rod arms 146 on the vertical stand 148, we provide flat press plates 152 which are mounted to the vertical stand so as to allow the plates to move against the expandable rod arms on either side. This can be accomplished by any one of several means known in the art such as being moved by a hydraulically operated system or a pneumatically operated system. The vertical stand 148 has a plurality of the expandable rod arms 146 thereon such as four sets that are 90 degrees spaced therefrom.

In accordance with one embodiment of our invention, we provide an airport 154 in the end of or tip of the expandable rod arms 146 for aiding in the removal of the flattened nest of plastic bags 114.

Figure 28:
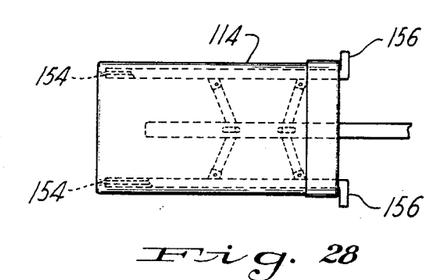
FIG. 28 is a schematic showing of the expandable rod arms shown in FIG. 27, in the expanded condition and with bags thereon.

As the secondary mandrel 136 is in a position of direct alignment with the expandable rod arms 146, the secondary mandrel moves towards, and onto the expandable rod arms which are in their collapsed condition, to a point where the nest of bags 114 is seated over the expandable rod arms. At this time the secondary mandrel 136 ejects the nest of bags 114 onto the expandable rod arms by a blast of air through the airports 140 against the bottom and under the cuffs of the bags on the secondary mandrel as it withdraws to the separated position for further rotation. The expanded rod arms 146 now expand to the full width of the nest of bags 114 so as to cause the bottom portion of the nest of bags to start folding over on one side towards the cuff of the bags. At this point the press plates 152 are actuated and move against both sides of the nest of bags 114 so as to compress the nest of bags flat. In accordance with another embodiment of our invention, we provide adjustable stops 156 located on the expandable rod arms 146, which can be adjusted to fit the length of the nest of bags 114 being processed. These adjustable stops 156 prevent the cuffed portion of the nest of bags from being distorted when the press plates 152 are performing their operation.

Figure 29:
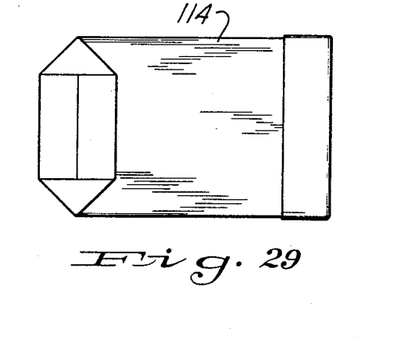
FIG. 29 shows a group of bags, nested cuffed and folded flat.

After the nested and cuffed bags 114 have been pressed flat by the press plates 152, the press plates retract to their original position and the expandable rod arms 146 having the now flattened nested and cuffed bags 114 thereon, are rotated 90 degrees to the unloading position. A blast of air is induced through the air port 154 at the end of or tip of the expandable rod arms 146 thus ejecting the flattened nested and cuffed bags 114 which are now ready for use. At this point the expandable rod arms 146 now collapse and are pivoted to their next position, simultaneously rotating the next set of expandable rod arms with flattened nested and cuffed bags 114 thereon to the unloading position. Thus the cycle is repeated.

It will be noted as shown in FIG. 24 that in accordance with one embodiment of our invention the primary mandrel 158 is hollow and the secondary mandrel 160 is solid. In accordance with this embodiment the bags 114 would be inverted and nested on the primary mandrel 158. A bag 114 would be put on the primary mandrel 158 by the vacuum conveyors 116, 118 and held in place on the primary mandrel by the retaining clamps 131. The primary mandrel 158 then is rotated until it is in a position in conjunction with the secondary mandrel 160, at which time the solid secondary mandrel would move into the primary mandrel, so as to invert and cuff the bag 114 on the primary mandrel. Thus an inverted and cuffed bag 114 is now on the primary mandrel 158 which is now rotated again to a position where it will receive another bag thereon. When the desired number of bags 114 have been put on the primary mandrel 158 in this manner, the primary mandrel is rotated to a position where the bags are then removed by any one of several methods such as by moving air from the primary mandrel under the cuffs of the bags to cause them to be ejected.

We claim:

1. Apparatus for the production of nested plastic bags from a strip of plastic film folded lengthwise comprising:
    (a) means for sealing the end of said strip of plastic film;
    (b) a hollow production mandrel;
    (c) means for inserting the production mandrel between the folds of said strip of film adjacent the sealed end of said film;
    (d) sealing means adjacent the production mandrel comprising a cutting and sealing means that produces a cut across the film and seals the plastic film on both sides of the cut; and
    (e) means for removing each successive bag from the production mandrel before another bag is produced thereon, said latter means comprising a secondary mandrel, the outside of said secondary mandrel shaped similarly to and having a smaller circumference than the outer shell of said production mandrel.

2. Apparatus as defined in claim 1 wherein a plurality of secondary mandrels are provided and wherein another secondary mandrel is moved toward position to receive new bags when one secondary mandrel is moved to a position for unloading of the bags thereon.

3. Apparatus as defined in claim 1 wherein air jets are provided in the mouth of the secondary mandrel for encouraging the removal of bags therefrom.

4. Apparatus as defined in claim 1 wherein said hollow production mandrel has a nose piece centered therein and concentric with the outer shell thereof.

5. Apparatus for nesting plastic bags comprising:
    (a) means for gripping and opening plastic bags;
    (b) means for moving said plastic bags while in an opened condition over a primary mandrel, the primary mandrel having a nose and a concentric shell around the nose spaced therefrom;
    (c) a hollow secondary mandrel which is of a configuration to fit over the outside of the nose of and inside the shell of said primary mandrel; and
    (d) means for moving said primary mandrel and said secondary mandrel into conjunction and then out of conjunction with each other.

6. Apparatus as defined in claim 5 wherein a plurality of primary mandrels are mounted to successively receive bags from said gripping means, and a plurality of secondary mandrels are mounted to successively receive bags from said primary mandrels.

7. Apparatus as defined in claim 5 including means for collapsing of said bags comprising a pair of expandable rods, cooperable with said secondary mandrel, for ejection of bags thereon, from said secondary mandrel, said rods expandable to the full width of said bags to cause opposed sides of said bags to come together transverse the direction of expansion of said rods.

8. Apparatus as defined in claim 7 wherein pressing means comprising two pressing plates are connected to cooperate with said pair of rods for pressing the bottom portion of said bags along one of said opposed sides.

References Cited

UNITED STATES PATENTS

| | | | |
|---|---|---|---|
| 1,381,419 | 6/1921 | Hyams | 93—8 |
| 1,574,259 | 2/1926 | Sarff | 93—93 |
| 1,594,442 | 8/1926 | Barbieri | 93—93 |
| 1,976,259 | 10/1934 | Jahne | 93—59 |
| 2,152,941 | 4/1939 | Wilcox | 93—36.01 |
| 2,270,185 | 1/1942 | Dulmage | 93—93 |
| 2,285,263 | 6/1942 | Fitch | 93—82 |
| 2,490,930 | 12/1949 | Thompson | 93—82 X |
| 2,601,480 | 6/1952 | Williams | 93—36.01 X |
| 2,622,953 | 12/1952 | Skillman | 93—35 |
| 2,671,383 | 3/1954 | Jungmayr | 93—59 |
| 2,893,294 | 7/1959 | Eaton | 93—8 |
| 2,939,259 | 6/1960 | Heckler | 93—84 |
| 2,951,322 | 9/1960 | Wood. | |
| 3,096,546 | 7/1963 | Edwards | 93—93 |
| 3,128,904 | 4/1964 | Reilly | 93—35 |
| 3,313,216 | 4/1967 | Piazze | 93—8 |
| 3,331,182 | 7/1967 | Hannon | 93—35 |
| 3,334,551 | 8/1967 | Cawley | 93—44.1 X |
| 3,354,795 | 11/1967 | Kugler | 93—33 |
| 3,372,625 | 3/1968 | Simecek | 93—33 |
| 3,379,101 | 4/1968 | Piazze | 93—35 |
| 3,385,176 | 5/1968 | Whitaker | 93—12 |
| 3,395,622 | 8/1968 | Kugler | 93—33 |
| 3,397,625 | 8/1968 | Leonard | 93—59 |
| 3,406,610 | 10/1968 | Golden | 93—8 |
| 3,416,410 | 12/1968 | Whitaker | 93—12 |
| 3,431,706 | 3/1969 | Stuck | 93—59 X |

WAYNE A. MORSE, JR., Primary Examiner

U.S. Cl. X.R.

93—8, 33, 35, 36.01, 59, 84, 93